United States Patent [19]
Kanie et al.

[11] 3,758,198
[45] Sept. 11, 1973

[54] FITTING DEVICE FOR THE ACCESSORIES OF A CAMERA

[75] Inventors: Shiomi Kanie, Midori-ku, Higashi Hongo Daini Jutaku, Yohohama; Takeo Shoji, Meguro-ku, Tokyo; Isao Nogi, Kanagawa-ku, Yokohama; Taizo Mitani, Kohuku-ku, Yokohama, all of Japan

[73] Assignee: Canon Kabushiki Kaisha, Tokyo, Japan

[22] Filed: Apr. 4, 1972

[21] Appl. No.: 241,034

[30] Foreign Application Priority Data
Apr. 16, 1971  Japan.............................. 46/24781

[52] U.S. Cl. ................................. 350/257, 350/251
[51] Int. Cl. ............................................... G02b 7/02
[58] Field of Search ......................350/245–257, 178

[56] References Cited
UNITED STATES PATENTS
3,572,905  3/1971  Schlapp .............................. 350/257
3,441,339  4/1969  Rederer et al...................... 350/255

FOREIGN PATENTS OR APPLICATIONS
621,875  4/1949  Great Britain...................... 350/252

Primary Examiner—David Schonberg
Assistant Examiner—Michael J. Tokar
Attorney—John J. McGlew et al.

[57] ABSTRACT

Fitting device for the accessories such as lens hood, etc. by means of a revolving bayonet mount system, comprising projections for fitting on the periphery of lens tube, the accessories having brims engageable with said projections and elastic pieces made of synthetic material, and at an engaged position of said projections with said brims, said elastic pieces are compressed between said projections of the lens tube and the accessories, thus the latter is held on the former by the resiliency of said elastic pieces.

8 Claims, 6 Drawing Figures

FITTING DEVICE FOR THE ACCESSORIES OF A CAMERA

BACKGROUND OF INVENTION

Usually, in these kinds of bayonet mount system, there are well known those devices, in which joining projections or overlapped portions of brims are pressed by metallic springs, thus holding the accessories on the camera body or the lens tube by the frictional force, however, in such devices, there are disadvantages that when the accessories are attached and detached, the surface of joining projections is injured or its coating is peeled away by the friction with the spring or the joining projections cooperating therewith, resulting in the injury of its external appearance.

It is the object of this invention to eliminate said disadvantages of the fitting device in such a manner that instead of said metallic springs, holding pieces made of elastic material are used to hold accessories such as lens hood by their pressure in radial direction.

SUMMARY OF INVENTION

This invention relates to a fitting device for the accessories of a camera, more particularly to an improvement of a device for fitting the accessories such as lens hood onto the front end of a lens tube by means of the bayonet mount system.

According to this invention, the fitting device is formed in combination of constructive elements, comprising a lens tube for camera having plural joining projections, accessories for a camera having fitting portions to said lens tube and having plural brims engageable with said joining projections on said fitting portions, wherein said accessories are locked in such a manner that the brims thereof will engage with the joining projections at a position revolved from the fitting position to the lens tube in a certain angle, thus preventing the accessories from slipping out forward. The fitting portions of said accessories to said lens tube have holding pieces made of elastic material and these pieces are compressed between the projections of said lens tube and the accessories at said locked position, thus the accessories are held on the lens tube by the resiliency of said elastic pieces.

BRIEF DESCRIPTION OF DRAWINGS

In the accompanying drawings, some embodiments of this invention are shown in schematic manner, in which;

FIG. 3 is a cross-sectional view showing a state after the bayonet mount is effected in the same embodiment, and FIG. 4 to FIG. 6 inclusive show another embodiment of this invention, wherein

Figure 1:
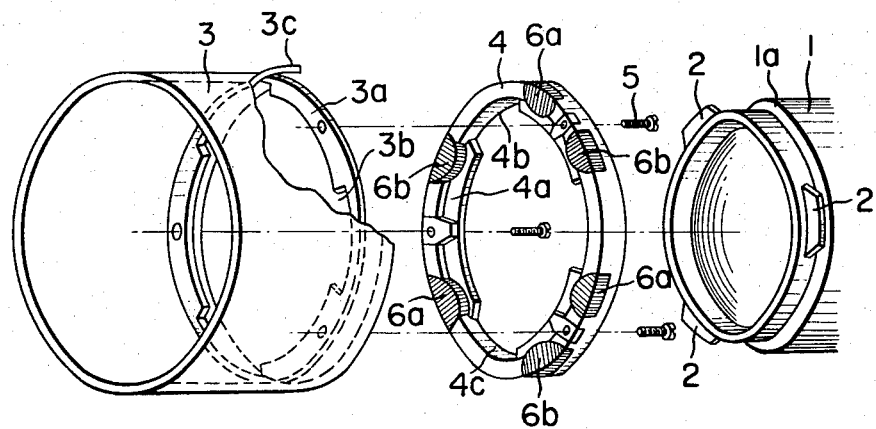
FIG. 1 is a perspective view of disassembled fitting device for lens hood according to this invention.

DESCRIPTION OF PREFERRED EMBODIMENTS:

In FIG. 1, 1 denotes a lens tube of a camera, on the periphery of its front end portion, there are provided with three joining projections 2 extending outwardly. 3 denotes a cylindrical lens hood having brims 3a on its inner periphery near its rear end, in which brims, there are provided with notched portions 3b for receiving the joining projections 2 of the lens tube. 4 denotes a joining ring fitted in the inner periphery of said lens hood 3, having notched portions 4b for receiving the projections 2 of the lens tube and projecting brims 4a engageable with said projections 2, to be fixed to said brims 3a of the hood 3 by means of small screws 5. 6a and 6b denote holding pieces made of elastic material, which are pushed in the notched portions provided on the peripheral wall of ring 4 incapably of slipping out to the central direction and are caught and fixed among the peripheral wall 3c of lens hood 3, the brims 3a and 4a, and their circular ends are slightly projecting from the inner peripheral surface 4c of the ring 4.

7 denotes stoppers for the joining projections 2 and are provided at the center of the brims 4a, and said holding pieces 6a, 6b are symmetrically arranged on both sides of the stoppers 7 near both ends of said brims 4a.

Figure 2:
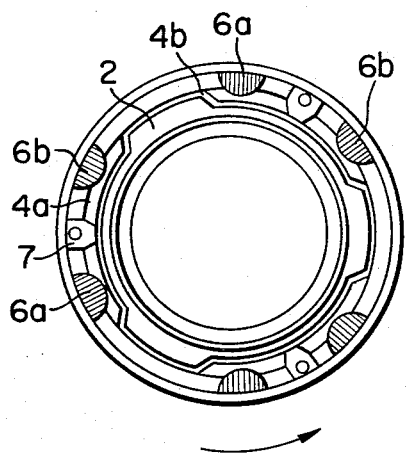
FIG. 2 is a cross-sectional view showing a state before the bayonet mount is effected in the embodiment shown in FIG. 1.
Figure 3:
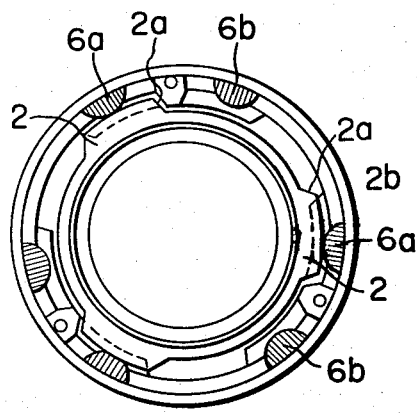

As shown in FIG. 2, when the lens hood 3 is fitted on the front end of the lens tube 1 by setting the projections 2 to the notched portions 4b and the lens hood is turned to the direction of the arrow at a position where the rear end of the ring 4 abuts on the shoulder 1a of the lens tube 1, the projections 2 will enter in the gaps between the brims 3a and 4a, then the circular face of the holding pieces 6a will hit on the slanting surfaces of the projections 2 and by successive turning of the hood, the holding pieces 6a are compressed to get over the slanting surfaces 2a of the projections 2, thus to contact with the outer periphery 2b. The turning of lens hood is stopped at a position where the stoppers 7 hit on the slanting faces 2a of the projections 2, and the movement of the hood in the direction of optical axis is obstructed by the engagement of the brims 4a with the joining projections 2 of the lens tube, as shown in FIG. 3, thus the resiliences of three holding pieces 6a act between the outer periphery 2b of the projections 2 and the peripheral wall 3c of the hood to obstruct said movement of the hood, which will be fixed to the lens tube then.

When the lens hood is turned from the position of FIG. 2 in opposite direction of the arrow, the holding pieces 6b may act on the projections 2 to fix the hood in the same manner as the case mentioned above.

In this embodiment, the lens hood is provided with the brims 3a and 4a of the same shape facing each other, the stoppers 7 are provided at the center of the projections and the holding pieces 6a and 6b are provided symmetrically, so that there is an advantage that the lens hood may be turned either to the right or to the left, when it is fitted on the lens tube. Particularly, when a camera is received in a leather case and the lens hood is turned upside down to put on the lens tube, it may be joined with bayonet by turning the hood in the same direction as the fitting for use, so that it is very convenient for use, since the user may turn the hood to the same direction in either case according to his habit.

Figure 4:
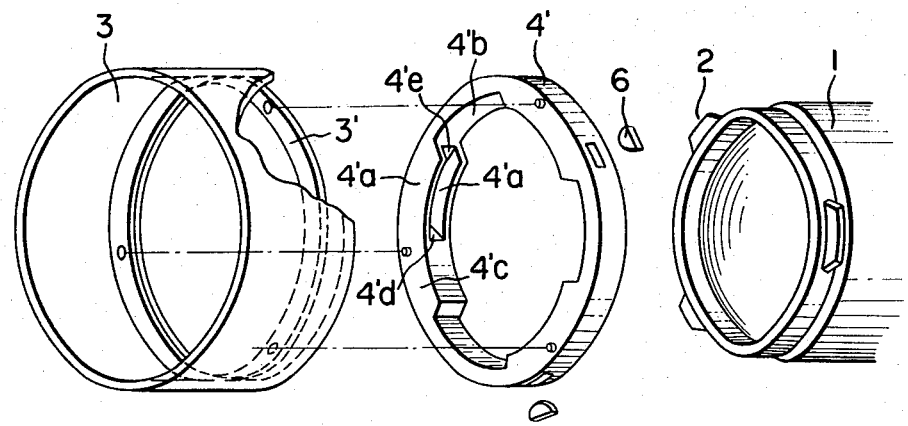
FIG. 4 is a perspective view corresponding to FIG. 1.
Figure 5:
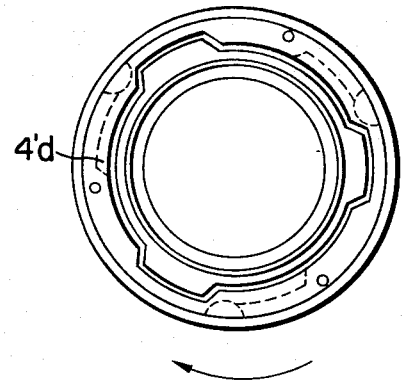
FIG. 5 is a cross-sectional view corresponding to FIG. 2.
Figure 6:
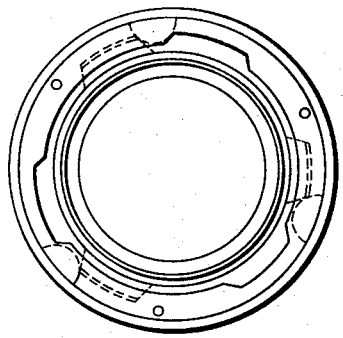
FIG. 6 is a cross-sectional view corresponding to FIG. 3.

FIG. 4 to FIG. 6 inclusive show another embodiment of this invention, wherein 4' denotes a fitting ring made of synthetic resin, 4'b notched portions for receiving the joining projections 2 of the lens tube, and on a part of projections 4'c, brims 4'a and 4'a are provided face to face putting a groove 4'e between them, and one end of this groove is formed as a stopper for the projections 2 of the lens tube. 6 denotes holding pieces, of which front ends are slightly projecting from the inner peripheral surface of said groove 4'e through holes passing through the peripheral wall of said ring 4'.

The ring 4' is fixed by means of screws or rivets and the like on brims 3' which are provided on the inner periphery near the rear end of a lens hood 3, in the same manner as the case of above mentioned embodiment.

As shown in FIG. 5, when the lens hood is fitted on the lens tube by setting the projections 2 to the notched portions 4'b and is turned to the direction of the arrow, the holding pieces 6 are compressed to move on the outer periphery of the projections 2, thus the hood is stopped at a position where stoppers 4'd hit on the projections 2, in the same manner as above mentioned case. Hereupon, the interval between the stoppers 4'd and the holding pieces 6 is little narrower than the width of the projections 2, so that the holding pieces 6 will get over the outer periphery of projections 2 to fall in the slanting surface of opposite side and contact with said surface by little pressure to obstruct the turning of the lens hood, as shown in FIG. 6.

In this embodiment, the fitting ring 4' is made of synthetic resin, so that even though there are any friction between the joining projections 2 of the lens tube and the brims 4'a, the surface of the projections 2 will never be injured and since little deformation of the holding pieces remains at the stop position, the holding pieces will cause little permanent deformation, even though they are left intact.

In view of the explanation about said embodiments, according to this invention, in a fitting device for the accessories such as lens hood, filter and the like, the holding pieces made of elastic material are compressed between the accessories and the joining projections and the resiliency of said pieces is made to act in the radial direction of lens to hold the accessories on the lens tube, so that the device has such an effect that the accessories may be simply and surely held on the lens tube without injuring the tube nor its external appearance.

As the material for said holding pieces, synthetic rubber, such as urethan-rubber, fluorine-rubber, silicon-rubber, neoprene-rubber and the like may be used, however, the material is by no means limited to these kinds, but any other material may be used therefor, if it has proper compression-proof property and elasticity and never cause permanent deformation by the compression for a long time.

We claim:

1. A fitting device for use in detachably securing a tubular accessory having a securing end with an internal ring recessed in said securing end to a camera having a tubular camera portion with a plurality of circumferentially spaced mounting projections, comprising a joining ring adapted to be secured to the internal ring of the accessory and having a plurality of circumferentially spaced holding projections with the size of said tube being sufficient to receive the tubular camera portion with the spacing between the holding projections being sufficient to accommodate said mounting projections therebetween, said holding projections being spaced from the internal ring of the accessory tube when said joining ring is secured to said accessory tube, said joining ring having a plurality of circumferentially spaced inwardly extending resilient holding portions which engage against the mounting projections when the accessory tube with said joining ring are rotated after they are positioned over the tubular camera portion and the mounting projections are inserted between the holding projections and thereafter to position the holding projections behind the mounting projections and to compressively engage the holding projections with the resilient holding portions.

2. A fitting device, according to claim 1, wherein said accessory ring includes an inwardly extending stopper centrally disposed over each of said holding projections, said resilient holding portions being located on each side of said stopper which compressively engage with the mounting projections when they are positioned behind said holding projections.

3. A fitting device, according to claim 1, wherein said tubular accessory comprises a lens tube having said internal ring, said ring being spaced from said holding projections in an axial direction to accommodate said mounting projections therebetween.

4. A fitting device, according to claim 1, wherein said accessory ring includes holding projections in the form of two axially spaced projections forming a notch therebetween for receiving the mounting projections therein.

5. A fitting device, according to claim 1, wherein said resilient holding portions comprise a synthetic material.

6. A fitting device, according to claim 1, including means on said accessory ring for securing said ring to the ring of said tubular accessory.

7. A fitting device, according to claim 1, wherein said resilient holding portions comprise inwardly extending rounded resilient members.

8. An accessory fitting device of the bayonet mount type for use with, in combination, a camera and an accessory for the camera, the construction comprising a lens tube of the camera having a front portion joining with a plurality of joining projections and an accessory for the camera having a tubular fitting portion for said lens tube, a pair of opposed brim-like substantially similarly shaped projections mounted in said fitting portion in spaced relationship to each other so as to define a nip for receiving said joining projections therebetween, and which can be attached not only in the forward direction but in the inverse direction to the lens tube, said accessory being rotatable through a certain angle from the position at which it fits the lens tube to one in which the brim-like projections engage behind the joining projections, said fitting device being engageable in said tubular fitting portion and engaged against said lens tube and having a plurality of inwardly projecting holding pieces made of elastic material, compressed against the projections of said lens tube and the accessory in the interlocked position so that the accessory can be held on the lens tube by said holding pieces.

* * * * *